(12) United States Patent
Mitchell

(10) Patent No.: US 11,340,112 B1
(45) Date of Patent: May 24, 2022

(54) REFLECTIVE RELAY SPECTROMETER

(71) Applicant: Wavefront Research, Inc., Northampton, PA (US)

(72) Inventor: Thomas A. Mitchell, Northampton, PA (US)

(73) Assignee: Wavefront Research, Inc., Northhampton, PA (US)

( * ) Notice: Subject to any disclaimer, the term of this patent is extended or adjusted under 35 U.S.C. 154(b) by 130 days.

(21) Appl. No.: 16/932,358

(22) Filed: Jul. 17, 2020

Related U.S. Application Data

(63) Continuation of application No. 14/657,355, filed on Mar. 13, 2015, now Pat. No. 10,718,667.

(60) Provisional application No. 61/953,266, filed on Mar. 14, 2014.

(51) Int. Cl.
| | |
|---|---|
| *G01J 3/18* | (2006.01) |
| *G01J 3/02* | (2006.01) |
| *G01J 3/28* | (2006.01) |

(52) U.S. Cl.
CPC ............... *G01J 3/18* (2013.01); *G01J 3/0205* (2013.01); *G01J 3/2823* (2013.01); *G01J 2003/1861* (2013.01)

(58) Field of Classification Search
CPC ..... G02B 5/1842; G02B 27/30; G01J 3/0208; G01J 3/2823; G01J 3/18
See application file for complete search history.

(56) References Cited

U.S. PATENT DOCUMENTS

| | | |
|---|---|---|
| 5,305,083 A | 4/1994 | Marianik et al. |
| 6,104,488 A | 8/2000 | LeVan |
| 7,898,660 B2 | 3/2011 | Warren |
| 8,773,659 B2 | 7/2014 | McLure |
| 2007/0252989 A1 | 11/2007 | Comstock |
| 2015/0022811 A1 | 1/2015 | Cornell et al. |

OTHER PUBLICATIONS

D.R. Lobb, Imaging spectrometers using concentric optics, Proc. SPIE 3118, Imaging Spectrometry III, (Oct. 31, 1997).
F. M. Reininger et al., Visible Infrared Mapping Spectrometer—visible channel (VIMS-V), Proc. SPIE 2198, Instrumentation in Astronomy VIII, (Jun. 1, 1994).
B. Sang et al., The EnMAP hyperspectral imaging spectrometer: instrument concept, calibration, and technologies, Proc. SPIE 7086, Imaging Spectrometry XIII, 708605 (Aug. 27, 2008).
Li Xu et al., Optical design of wide waveband compact imaging spectrometer with fast speed, Proc. SPIE 8200, 2011 International Conference on Optical Instruments and Technology: Optoelectronic Imaging and Processing Technology, 82000C (Nov. 28, 2011).

*Primary Examiner* — Maurice C Smith
(74) *Attorney, Agent, or Firm* — Culhane Meadows PLLC; Orlando Lopez

(57) ABSTRACT

A reflective relay spectrometer design based on reflective optical relay systems, which is more compact in physical size and superior in spectral imaging quality than previous designs, is disclosed.

7 Claims, 2 Drawing Sheets

REFLECTIVE RELAY SPECTROMETER

CROSS-REFERENCE TO RELATED APPLICATIONS

This application is a continuation of co-pending U.S. application Ser. No. 14/657,355, filed on Mar. 13, 2015, entitled REFLECTIVE RELAY SPECTROMETER, which claims priority to and benefit of U.S. Provisional Application No. 61/953,266, filed Mar. 14, 2014, entitled REFLECTIVE RELAY SPECTROMETER, the entire contents of which are incorporated herein by reference for all purposes.

STATEMENT OF FEDERALLY SPONSORED RESEARCH OR DEVELOPMENT

This invention was made with U.S. Government support from the U.S. Army under contract W15P7T-06-D-R401, subcontract R401-SC-20316-0252. The U.S. Government has certain rights in the invention.

BACKGROUND

These teachings relate to relay spectrometers.

Current optically fast spectrometer designs are either too large in size for many applications, including but not limited to, unmanned aircraft, and forensic fieldwork, or their dispersing elements are complex and costly to fabricate, or they do not provide enough spatial and spectral imaging quality to meet the required system performance, or they do not provide enough throughput or optical speed, or they cannot provide a combination of these characteristics simultaneously.

SUMMARY

The embodiments of the present teachings provide a reflective relay spectrometer design based on reflective optical relay systems, which is more compact in physical size and superior in spectral imaging quality than previous designs.

The embodiments disclosed hereinbelow follow design principles such as those disclosed in U.S. Pat. No. 7,061,611, which is incorporated by reference herein in its entirety and for all purposes. The symmetrical principle (described in Warren J. Smith, "Modern Optical Engineering", Second Edition, McGraw Hill Book Co., N.Y., N.Y., 1990, p. 372) states that for an optical system that is completely symmetric about the optical stop, all transverse aberrations including coma, distortion, and lateral color are identically zero. Even for systems that deviate slightly from perfect symmetry, these aberrations are greatly reduced. A slight deviation may be considered any deviation whereby the lateral aberration contribution from one side of the optical stop substantially corrects the lateral aberration contribution from the other side of the optical stop, and systems of this type can be considered substantially symmetric and designed substantially according to a symmetrical principle, regardless of their magnification. Unity magnification symmetric refractive relays make use of this symmetrical principle, although unity magnification is not a requirement for the use of this design principle, and have been widely used in photocopiers, rifle sights, and periscope systems. A spectrometer design based on a substantially symmetric refractive relay system can take advantage of this principle, where the elimination of distortion and lateral color aberrations in particular contribute to the reduction of spectral smile and keystone distortions.

The present disclosure provides a spectrometer design comprising: at least one slit element located at an object plane; a first optical subassembly configured to substantially collimate, at a center plane, electromagnetic radiation or light emanating from the at least one slit element, wherein the first optical subassembly comprises at least one reflective optical element; at least one dispersing element located substantially at the center plane, configured to angularly separate the electromagnetic radiation emanating from the center plane according to its wavelength; a second optical subassembly configured to substantially image, at an image plane, the electromagnetic radiation emanating from the dispersing element, wherein the second optical subassembly comprises at least one reflective optical element; and a detecting element substantially located at the image plane.

In one embodiment, the first optical subsystem comprises three reflective elements that share a first common optical axis, the dispersive element is a plane parallel transmission diffraction grating, and the second optical subsystem comprises three reflective elements that share a second common axis, where the second common axis is substantially not parallel to the first common axis.

For a better understanding of the present teachings, together with other and further objects thereof, reference is made to the accompanying drawings and detailed description and its scope will be pointed out in the appended claims.

DETAILED DESCRIPTION

These teachings relate to a spectrometer design based on reflective optical relay systems, which is more compact in physical size and superior in spectral imaging quality than previous designs.

Current optically fast spectrometer designs are either too large in size for many applications, including but not limited to, unmanned aircraft, and forensic fieldwork, or their dispersing elements are complex and costly to fabricate, or they do not provide enough spatial and spectral imaging quality to meet the required system performance, or they do not provide enough throughput or optical speed, or they cannot provide a combination of these characteristics simultaneously.

For example, consider some applications of hyperspectral imaging in which it is desirable to have a spectrometer that simultaneously possesses a large spectral bandwidth such as the combined visible, near infrared and shortwave infrared bands, a large spatial field so that a large ground area can be covered with a single fly-over, high spatial and spectral resolutions so that small spatial and spectral features can be resolved, negligible spectral and spatial distortions to facilitate recognition algorithms, a fast optical speed, a very small size and mass so that the system can be transported in an unmanned aerial vehicles (UAV) or be man-portable, and is readily manufacturable from low-cost components.

Figure 1:
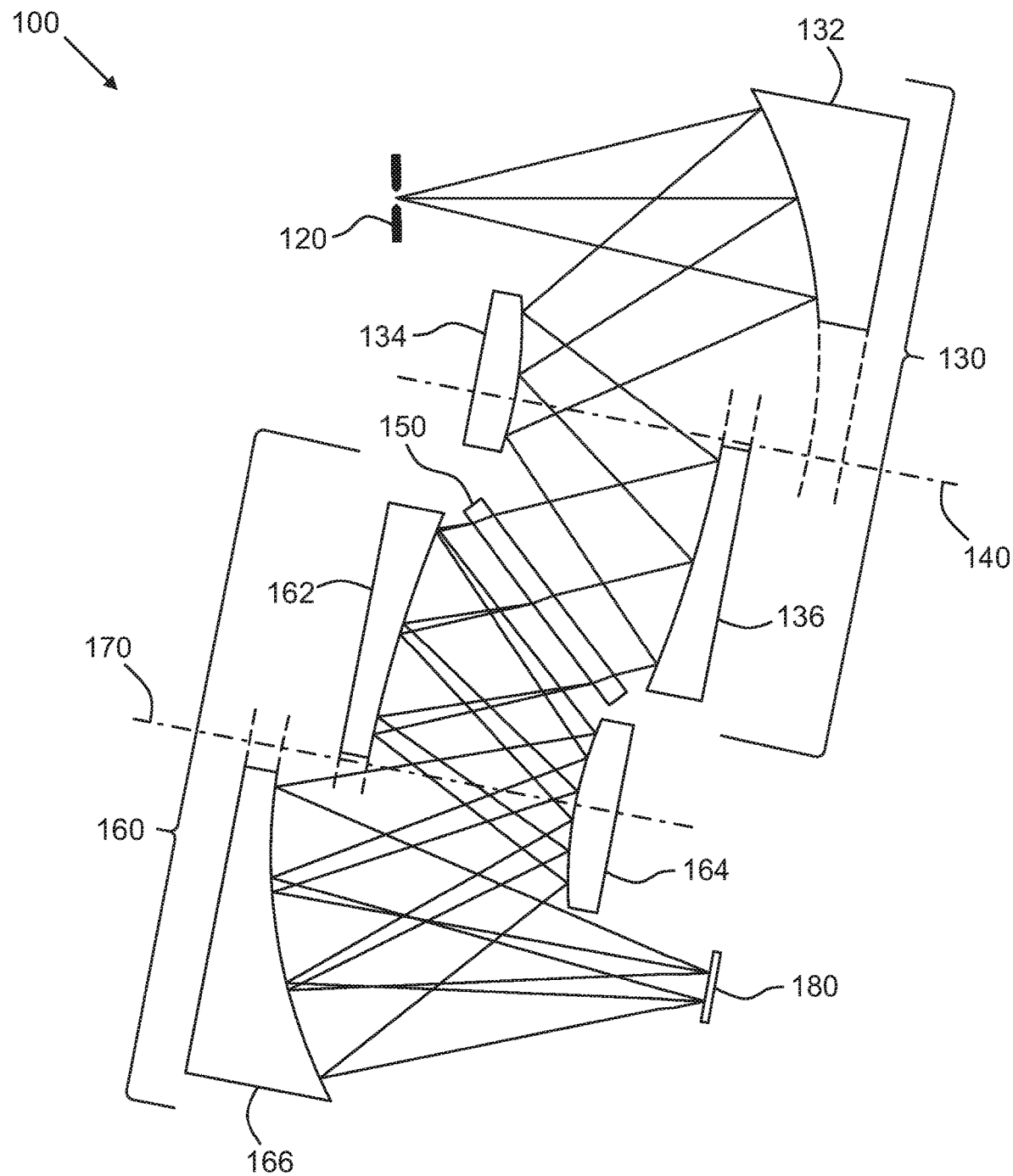
FIG. 1 is a schematic view of an embodiment of the present teachings, taken along its optical axes.

Reference is made to FIG. 1, which is a schematic view of an embodiment of the present teachings 100 taken along its optical axis in the plane parallel to the direction of dispersion. In operation, electromagnetic radiation, typically in the ultraviolet, visible, and/or infrared bands, hereinafter referred to generally as light, emitted or reflected by a given object, either real or virtual, hereinafter referred to generally as the source 120, located at the object plane, in this embodiment, but not limited to, a mechanical slit aperture, an optical slit aperture, an array of optical fibers, or other method of extracting a line image, hereinafter referred to generally as a slit element, is incident on a first portion 130 of an imaging optical system, in this embodiment made up of, but not limited to, three reflective elements 132, 134, and 136 that, in this embodiment, share a common optical axis 140, which is capable of substantially receiving a portion of the light from the source 120 and substantially collimating the light. The light is then incident on dispersing element 150, one embodiment of which is a transmission diffraction grating, volume diffraction grating, dispersing prism, or other method of diffracting light, but in general is any method of angularly separating light energy according to its wavelength, hereinafter referred to generally as a dispersing element, which is capable of substantially receiving the light from the first portion 130 of the imaging optical system. The diffracted light is then incident on a second portion 160 of the imaging optical system, in this embodiment made up of, but not limited to, three reflective elements 162, 164, and 166 that in this embodiment share a common optical axis 170, which is capable of substantially receiving the light from the dispersing element 150 and substantially focusing the light to a focus position (hereinafter also referred to as an image plane) of a CCD array, phosphorescent screen, photographic film, microbolometer array, or other means of detecting light energy, hereinafter referred to generally as a detecting element 180.

Figure 2:
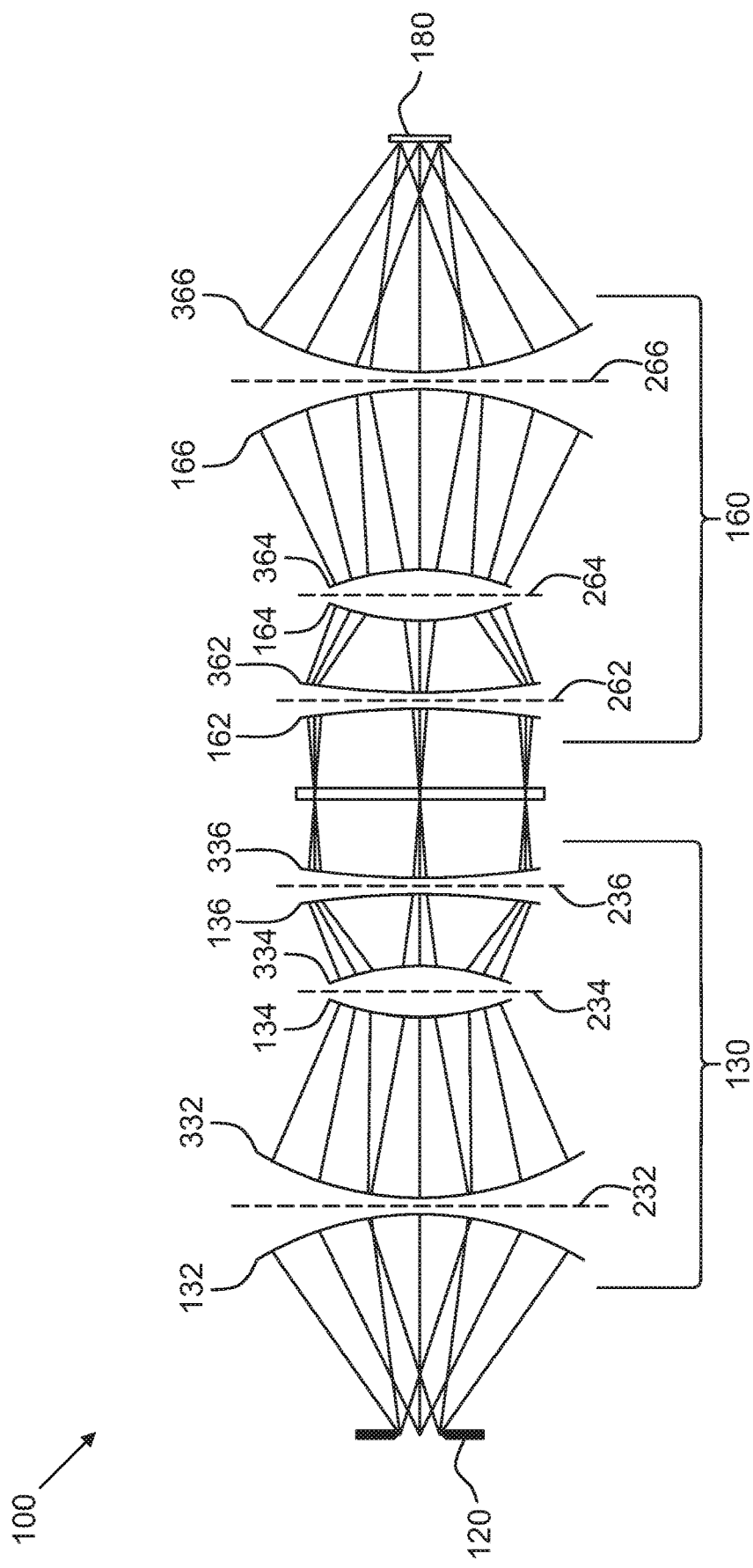
FIG. 2 is a schematic view of the embodiment of the present teachings illustrated in FIG. 1, in the plane orthogonal to that of FIG. 1.

Reference is made to FIG. 2, which is a schematic view of the embodiment of the present teachings 100, taken along the plane orthogonal to that illustrated in FIG. 1. To better illustrate the imaging properties of the embodiment of the present teachings, the imaging optical system is unfolded at each of the reflective elements to illustrate the schematic view in a single plane. Light from a single or multiple field positions at the source 120, in this embodiment, but not limited to, a slit element, is incident on a first portion 130 of an imaging optical system, in this embodiment made up of, but not limited to, three reflective elements 132, 134, and 136, which is capable of substantially receiving a portion of the light from the source 120 and substantially collimating the light. For clarity in illustration, light reflected by the reflective element 132 is shown unfolded as light reflected by the mirror image 332 of the reflective element 132 about the plane 232. Likewise, light reflected by the reflective element 134 is shown unfolded as light reflected by the mirror image 334 of the reflective element 134 about the plane 234 and light reflected by the reflective element 136 is shown unfolded as light reflected by the mirror image 336 of the reflective element 136 about the plane 236. The light is then incident on a dispersing element 150, in this embodiment a transmission diffraction grating, which is capable of substantially receiving the light from the first portion 130 of the imaging optical system. The diffracted light is then incident on a second portion 160 of the imaging optical system, in this embodiment made up of, but not limited to, three reflective elements 162, 164, and 166, which is capable of substantially receiving the light from the dispersing element 150 and substantially focusing the light to a focus position of a detecting element 180. For clarity in illustration, light reflected by the reflective element 162 is shown unfolded as light reflected by the mirror image 362 of the reflective element 162 about the plane 262. Likewise, light reflected by the reflective element 164 is shown unfolded as light reflected by the mirror image 364 of the reflective element 164 about the plane 264 and light reflected by the reflective element 166 is shown unfolded as light reflected by the mirror image 366 of the reflective element 166 about the plane 266.

Any number of optical elements, reflective or refractive, can be used in the embodiments of the present teachings.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although the teachings have been described with respect to various embodiments, it should be realized these teachings are also capable of a wide variety of further and other embodiments within the spirit and scope of the teachings and the following claims.

The invention claimed is:

1. An optical imaging system comprising:
   at least one slit element located substantially at an object plane;
   a first optical system having at least two reflective elements, the first optical system being a collimating optical system;
   the collimating optical system being configured to substantially collimate, at a center plane, electromagnetic radiation emanating from the at least one slit element;
   at least one dispersing element being adapted to angularly separate electromagnetic radiation, emanating from the first optical system, according to its wavelength;
   a second optical system having at least two reflective elements;
   the first optical system and the second optical system having substantial symmetry about the center plane;
   the first optical system and the second optical system being designed together to reduce aberrations substantially in accordance with a symmetrical principle;
   the second optical system being adapted to substantially image, at an image plane, electromagnetic radiation emanating from the at least one dispersing element, said electromagnetic radiation emanating from the at least one dispersing element being angularly separated according to their wavelength;
   and
   a detecting element substantially located at an image plane;
   the detecting element being adapted to substantially receive electromagnetic radiation emanating from the second optical system;
   the at least two reflective elements of the first optical system sharing a first common optical axis;
   the at least two reflective elements of the second optical system sharing a second common optical axis;
   wherein the second common optical axis is not a same optical axis as the first common optical axis.

2. The optical imaging system of claim 1 wherein the at least one dispersing element is a transmission grating.

3. The optical imaging system of claim 1 wherein the first optical system and the second optical system comprise an optical relay system.

4. The optical imaging system of claim 3 wherein the second optical system is substantially symmetric to the first optical system.

5. The optical imaging system of claim 1 wherein the at least one dispersing element located substantially at the center plane.

6. An optical imaging system comprising:
- means for extracting at least one line source of electromagnetic radiation from a source of electromagnetic radiation;
- first means for substantially reflecting and collimating electromagnetic radiation emanating from the at least one line source;
- means for angularly separating substantially collimated electromagnetic radiation according to its wavelength;
- at least one detecting element;
- second means for reflecting and imaging angularly separated electromagnetic radiation onto the at least one detecting element;
- means for providing substantial optical symmetry about a center plane; and,
- means for substantially correcting transverse aberrations substantially according to a symmetrical principle while substantially collimating the electromagnetic radiation emanating from the at least one line source and imaging the angularly separated electromagnetic radiation;
- wherein the first means comprise at least two reflective elements; the at least two reflective elements of the first means sharing a first common optical axis;
- wherein the second means comprise at least two other reflective elements; the at least two other reflective elements of the second means sharing a second common optical axis; and
- wherein the second common optical axis is not a same optical axis as the first common optical axis.

7. The optical imaging system of claim 6 wherein said means for angularly separating substantially collimated electromagnetic radiation are substantially located at the center plane.

* * * * *